Dec. 16, 1930.  A. McDOUGALL  1,785,488
CASTING REEL FOR FISHING RODS
Filed May 27, 1927

Inventor
A. McDougall
By: Marks & Clerk
Attorneys.

Patented Dec. 16, 1930

1,785,488

UNITED STATES PATENT OFFICE

ANDREW McDOUGALL, OF PAREL, BOMBAY, INDIA

CASTING REEL FOR FISHING RODS

Application filed May 27, 1927, Serial No. 194,811, and in India July 9, 1926.

This invention relates to improvements in reels for fishing rods and has for its objects to provide a casting reel by which bait can be cast without overrunning, a fault common to all casting reels braked near the axis, and also to provide an optional and additional check which is easily and positively locked and which cannot disengage when a sudden force is applied to the line, as for instance when a heavy fish rushes off with the bait.

The invention consists in a casting reel constructed in two parts comprising a drum or reel secured to a groove or neck of a spindle attached to a back plate by means of a spring catch working in a boss of the journal of the drum, said boss being positioned at the free end of the journal, wherein a brake adjustably tensioned by a screw and spring, is fitted on the back plate and engages the rim of the reel, said brake being further controlled by a spring attached to a bracket which carries a ratchet pawl, substantially as described.

Referring to the accompanying drawings:—

Figure 1:
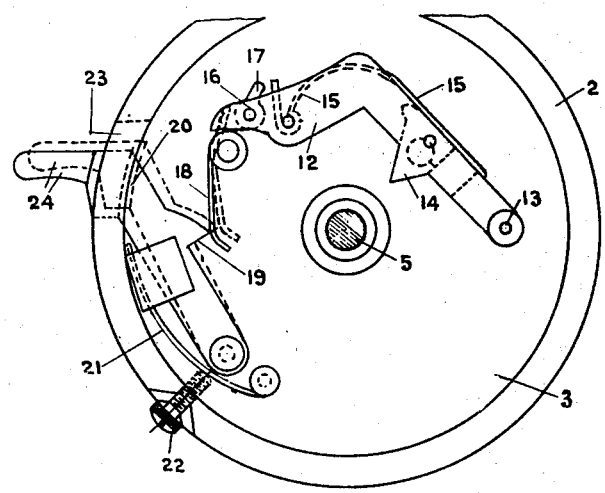
Figure 1 is a plan of the back plate of the outer frame carrying the ratchet gear.
Figure 2:
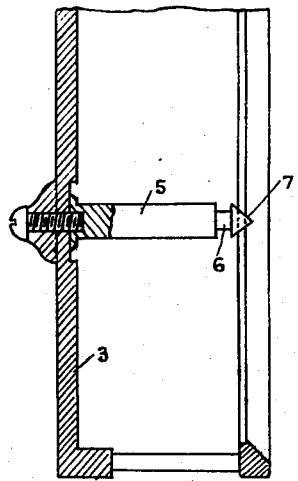
Figure 2 is a section of the outer frame.
Figure 3:
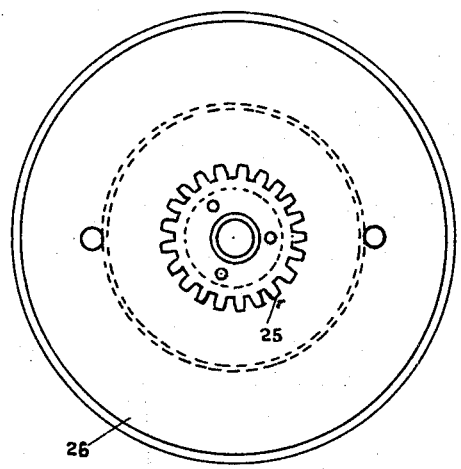
Figure 3 is a plan of the back plate of the inner reel or drum carrying the toothed wheel which engages the ratchet gear carried by the back plate of the outer frame.
Figure 4:
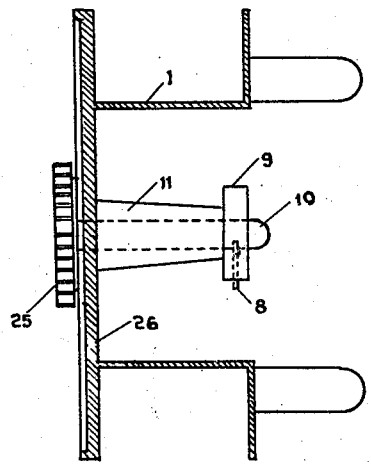
Figure 4 is a section of the inner reel or drum.
Figure 5:
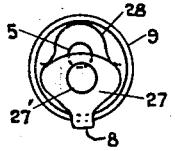
Figure 5 is an elevation (with the face plate removed) of the boss at the end of the journal, showing the spring clip which engages the central spindle attached to the back plate of the outer frame.
Figure 6:
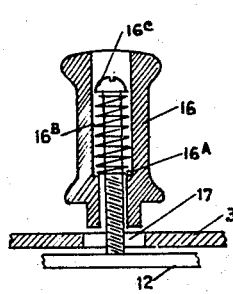
Figure 6 is a detail of the spring knob operating the bracket lever carrying the pawl.

The reel is constructed in two parts in the usual manner, the inner part which comprises the reel or drum 1 and which is detachable, and the outer part which comprises the frame 2 and the back plate 3, said back plate 3 being provided with a suitable bracket 4 for fixing it to the rod.

The back plate 3 has a central spindle 5, said spindle 5 being provided with a groove or neck 6 so as to form a stud 7 at its free end. Said groove 6 is engaged in the usual manner by a spring catch 8 contained in the boss 9 which is positioned at the free end 10 of the journal 11 of the drum or reel 1.

Affixed to the back plate 3 and suitably positioned is a bracket 12 pivoted at 13. The bracket 12 carries a ratchet pawl 14 controlled by a spring 15, said ratchet pawl 14 normally engaging the toothed wheel 25 which is affixed to the back plate 26 of the inner reel 1. Attached to the bracket 12 is an operating spring knob 16, said knob 16 passing through the back plate 3 and is operated from the outer or reverse side of the back plate 3. The knob 16 is hollowed out to form a shoulder 16A, on which a spring 16B rests, said spring engaging the head of the stud 16C, said stud being attached to the lever bracket 12 and slides in a slot 17, cut in the back plate 3. When the stud 16C is moved in said slot 17 by means of the knob 16 it carries with it the bracket 12 thereby disengaging the ratchet pawl 14 from the toothed wheel 25. Said knob operates by being first pulled out from an enlargement which it enters at the end of the slot 17 and is then moved over the slot.

Affixed to the bracket 12 is a spring 18, said spring 18 engages the lever arm 19 of the rim-brake 20. A spring 21 adjustable by a screw 22 of less tension than the spring 18 is also provided which engages the lever arm on the side opposite that engaged by the spring 18.

The lever arm 19 to which the rim-brake 20 is affixed, after passing through a slot 23 in the periphery of the frame 2 terminates in a trigger 24, said trigger 24 is so positioned as to be easily operated by a finger of the hand holding the rod.

The spring catch 8 comprises a disc 27 approximately pear-shaped, said disc 27 having a slot 27' of diameter equal to that of spindle 5 cut near its lower end. A spring 28 constrains the disc towards the opposite end of the boss, which is slotted to allow the projection 8 of the disc to emerge. By pressing the portion 8 inwards the disc is moved so as to allow the slot to coincide with the spindle 5 and on release, the disc springs back and engages the neck 6 of the spindle, thereby preventing the inner reel 1 from falling out of the outer frame 2.

The reel operates in the following manner:—

Before making a cast the spring knob 16 is pulled out of the enlarged end of the slot 17 and the stud 16B is moved along the slot. This clears pawl 14 from the teeth of the ratchet wheel 25, and spring 18 from lever arm 19. The pressure on spring 21 is regulated by means of the screw 22 so as to suit the weight of the bait to be cast. The trigger 24 of the lever 19 is pulled towards the rod with the finger, thereby applying the brake firmly, while the swing is being made for the cast, then at the moment of forward cast, the finger is released and the bait will fly out under control of the rim brake 20, as applied by the spring 21 when the effective control of the brake due to its position reduces the momentum of the bait cast, so that overrunning cannot take place. As soon as the bait touches the water the knob 16 is moved towards the enlarged end of the slot and snaps into the enlarged opening, automatically pushing off the brake, as the spring 18 is strong enough to overcome spring 21, when the knob 16 is locked against sliding.

The reel is now free from the brake and is ready to be wound in; should additional brake pressure be required trigger 24 of lever 19 is pressed upwards towards the rod when spring 18 yields and allows the brake block 20 to come into contact with the rim of the plate 26, of the reel.

Having now particularly described and ascertained the nature of my said invention and in what manner the same is to be performed, I declare that what I claim is:—

1. A casting reel comprising a plate, a drum rotatably mounted on said plate, a braking member pivoted on said plate, a pawl arm pivoted to said plate, a ratchet on said drum adapted to cooperate with said pawl, spring means secured to said plate and cooperating with said braking member to move said member into engagement with said drum, yieldable means secured to said pawl arm and adapted to move said member out of engagement with said drum against the action of said spring means, and means for locking said pawl arm and yieldable means in engagement with said ratchet and said braking member respectively.

2. A casting reel as claimed in claim 1, said braking member having a portion projecting beyond said plate to permit manual operation of said braking member.

3. A casting reel as claimed in claim 1, said locking means projecting beyond said plate and being adapted to move said pawl arm and yieldable means out of engagement with said ratchet and said braking member.

In testimony whereof I affix my signature.

ANDREW McDOUGALL.